(12) United States Patent
Sampson (10) Patent No.: US 8,616,128 B2
(45) Date of Patent: Dec. 31, 2013

(54) GAS GENERATOR

(75) Inventor: William P. Sampson, North Ogden, UT (US)

(73) Assignee: Alliant Techsystems Inc., Arlington, VA (US)

(*) Notice: Subject to any disclaimer, the term of this patent is extended or adjusted under 35 U.S.C. 154(b) by 0 days.

(21) Appl. No.: 13/267,410

(22) Filed: Oct. 6, 2011

(65) Prior Publication Data
US 2013/0087064 A1 Apr. 11, 2013

(51) Int. Cl.
*F42B 12/46* (2006.01)

(52) U.S. Cl.
USPC ............................ 102/367; 169/5; 169/46

(58) Field of Classification Search
USPC ............... 102/367, 368, 369, 370; 169/5, 46
See application file for complete search history.

(56) References Cited

U.S. PATENT DOCUMENTS

| | | |
|---|---|---|
| 1,839,658 A | 1/1932 | Dugas |
| 2,744,816 A | 5/1956 | Hutchison |
| 2,841,227 A | 7/1958 | Betzler |
| 3,255,824 A | 6/1966 | Rodgers |
| 3,524,506 A | 8/1970 | Weise |
| 3,641,935 A | 2/1972 | Gawlick et al. |
| 3,701,256 A | 10/1972 | Pelham et al. |
| 3,741,585 A | 6/1973 | Hendrickson et al. |
| 3,806,461 A | 4/1974 | Hendrickson et al. |
| 3,836,076 A | 9/1974 | Conrad et al. |
| 3,972,545 A | 8/1976 | Kirchoff et al. |
| 3,972,820 A | 8/1976 | Filter |
| 4,064,944 A | 12/1977 | McClure |
| 4,067,392 A | 1/1978 | Rich |
| 4,113,019 A | 9/1978 | Sobolev et al. |
| 4,224,994 A | 9/1980 | Tone et al. |
| 4,448,577 A | 5/1984 | Paczkowski |
| 4,505,336 A | 3/1985 | Thevis et al. |
| 4,601,344 A | 7/1986 | Reed et al. |
| 4,616,694 A | 10/1986 | Hsieh |
| 4,807,706 A | 2/1989 | Lambertsen et al. |

(Continued)

FOREIGN PATENT DOCUMENTS

| | | |
|---|---|---|
| DE | 195 46 528 A1 | 6/1997 |
| DE | 197 17 044 A1 | 10/1997 |

(Continued)

OTHER PUBLICATIONS

International Search Report from the ISA/EP, International Application No. PCT/US2011/055081, mailed Aug. 22, 2012, four (4) pages.

(Continued)

*Primary Examiner* — Michelle (Shelley) Clement
*Assistant Examiner* — John D Cooper
(74) *Attorney, Agent, or Firm* — TraskBritt (57) ABSTRACT

A gas generator assembly and method of operation. A plurality of stacks of laterally adjacent and laterally and axially supported gas generant wafers are contained within a housing. An igniter material is placed between the wafer stacks and an initiator. Upon ignition of the igniter material by the initiator, the wafer stacks are ignited and combust, generating a gas which, when reaching sufficient pressure within the housing in excess of ambient exterior pressures, opens a closed exhaust gas port and is released into a gas discharge structure where the gas passes through a heat sink material, cooling the gas before it exits the gas discharge structure for an intended use.

15 Claims, 6 Drawing Sheets

(56) References Cited

U.S. PATENT DOCUMENTS

| | | | |
|---|---|---|---|
| 4,817,828 A | 4/1989 | Goetz |
| 4,890,860 A | 1/1990 | Schneiter |
| 4,909,549 A | 3/1990 | Poole |
| 4,931,111 A | 6/1990 | Poole |
| 4,998,751 A | 3/1991 | Paxton et al. |
| 5,035,757 A | 7/1991 | Poole |
| 5,038,866 A | 8/1991 | Kern et al. |
| 5,060,867 A | 10/1991 | Luxton et al. |
| 5,197,758 A | 3/1993 | Lund et al. |
| 5,423,384 A | 6/1995 | Galbraith et al. |
| 5,425,886 A | 6/1995 | Smith |
| 5,429,691 A | 7/1995 | Hinshaw et al. |
| 5,439,537 A | 8/1995 | Hinshaw et al. |
| 5,441,114 A | 8/1995 | Spector et al. |
| 5,449,041 A | 9/1995 | Galbraith |
| 5,495,893 A | 3/1996 | Roberts et al. |
| 5,520,826 A | 5/1996 | Reed, Jr. et al. |
| 5,531,941 A | 7/1996 | Poole |
| 5,538,568 A | 7/1996 | Taylor et al. |
| 5,542,704 A | 8/1996 | Hamilton et al. |
| 5,544,687 A | 8/1996 | Barnes et al. |
| 5,588,493 A | 12/1996 | Spector et al. |
| 5,609,210 A | 3/1997 | Galbraith et al. |
| 5,610,359 A | 3/1997 | Spector et al. |
| 5,613,562 A | 3/1997 | Galbraith et al. |
| 5,673,935 A | 10/1997 | Hinshaw et al. |
| 5,725,699 A | 3/1998 | Hinshaw et al. |
| 5,735,118 A | 4/1998 | Hinshaw et al. |
| 5,739,460 A | 4/1998 | Knowlton et al. |
| 5,762,145 A | 6/1998 | Bennett |
| 5,783,773 A | 7/1998 | Poole |
| 5,820,160 A | 10/1998 | Johnson et al. |
| 5,845,716 A | 12/1998 | Birk |
| 5,845,933 A | 12/1998 | Walker et al. |
| 5,848,652 A | 12/1998 | Bennett |
| 5,861,106 A | 1/1999 | Olander |
| 5,865,257 A | 2/1999 | Kozyrev et al. |
| 5,876,062 A | 3/1999 | Hock |
| 5,882,036 A | 3/1999 | Moore et al. |
| 5,884,710 A | 3/1999 | Barnes et al. |
| 5,918,679 A | 7/1999 | Cramer |
| 5,957,210 A | 9/1999 | Cohrt et al. |
| 5,985,060 A | 11/1999 | Cabrera et al. |
| 5,992,528 A | 11/1999 | Parkinson et al. |
| 5,992,530 A | 11/1999 | Sundholm |
| 5,996,699 A | 12/1999 | Sundholm |
| 6,012,533 A | 1/2000 | Cramer |
| 6,016,874 A | 1/2000 | Bennett |
| 6,019,177 A | 2/2000 | Olander |
| 6,019,861 A | 2/2000 | Canterberry et al. |
| 6,024,889 A | 2/2000 | Holland et al. |
| 6,039,820 A | 3/2000 | Hinshaw et al. |
| 6,045,637 A | 4/2000 | Grzyll |
| 6,045,638 A | 4/2000 | Lundstrom |
| 6,065,774 A | 5/2000 | Cabrera |
| 6,076,468 A | 6/2000 | DiGiacomo et al. |
| 6,077,372 A | 6/2000 | Mendenhall et al. |
| 6,082,464 A | 7/2000 | Mitchell et al. |
| 6,086,693 A | 7/2000 | Mendenhall et al. |
| 6,089,326 A | 7/2000 | Drakin |
| 6,093,269 A | 7/2000 | Lundstrom et al. |
| 6,096,147 A | 8/2000 | Taylor et al. |
| 6,116,348 A | 9/2000 | Drakin |
| 6,123,359 A | 9/2000 | Cabrera et al. |
| 6,132,480 A | 10/2000 | Barnes et al. |
| 6,136,114 A | 10/2000 | Johnson et al. |
| 6,143,104 A | 11/2000 | Blomquist |
| 6,202,755 B1 | 3/2001 | Hardge |
| 6,217,788 B1 | 4/2001 | Wucherer et al. |
| 6,224,099 B1 | 5/2001 | Nielson et al. |
| 6,250,072 B1 | 6/2001 | Jacobson et al. |
| 6,257,341 B1 | 7/2001 | Bennett |
| 6,287,400 B1 | 9/2001 | Burns et al. |
| 6,314,754 B1 | 11/2001 | Kotliar |
| 6,328,906 B1 | 12/2001 | Lundstrom et al. |
| 6,334,315 B1 | 1/2002 | Kotliar |
| 6,371,384 B1 | 4/2002 | Garcia |
| 6,401,487 B1 | 6/2002 | Kotliar |
| 6,416,599 B1 | 7/2002 | Yoshikawa et al. |
| 6,418,752 B2 | 7/2002 | Kotliar |
| 6,435,552 B1 | 8/2002 | Lundstrom et al. |
| 6,474,684 B1 | 11/2002 | Ludwig et al. |
| 6,481,748 B1 | 11/2002 | Okuda et al. |
| 6,502,421 B2 | 1/2003 | Kotliar |
| 6,513,602 B1 | 2/2003 | Lewis et al. |
| 6,557,374 B2 | 5/2003 | Kotliar |
| 6,560,991 B1 | 5/2003 | Kotliar |
| 6,599,380 B2 | 7/2003 | Zeuner et al. |
| 6,601,653 B2 | 8/2003 | Grabow et al. |
| 6,605,233 B2 | 8/2003 | Knowlton et al. |
| 6,612,243 B1 | 9/2003 | Italiane et al. |
| 6,634,433 B2 | 10/2003 | Kim et al. |
| 6,739,399 B2 | 5/2004 | Wagner et al. |
| 6,851,483 B2 | 2/2005 | Olander |
| 6,935,433 B2 | 8/2005 | Gupta |
| 6,942,249 B2 | 9/2005 | Iwai et al. |
| 6,990,905 B1 * | 1/2006 | Manole et al. ............... 102/513 |
| 7,028,782 B2 | 4/2006 | Richardson |
| 7,156,184 B2 | 1/2007 | Wagner |
| 7,337,856 B2 | 3/2008 | Lund et al. |
| 7,845,423 B2 | 12/2010 | Lund et al. |
| 8,162,350 B1 | 4/2012 | Parkinson et al. |
| 8,408,322 B2 | 4/2013 | Blau et al. |
| 2002/0007886 A1 | 1/2002 | Neidert et al. |
| 2002/0020536 A1 | 2/2002 | Bennett |
| 2002/0137875 A1 | 9/2002 | Reed et al. |
| 2002/0195181 A1 | 12/2002 | Lundstrom et al. |
| 2004/0089460 A1 | 5/2004 | Richardson |
| 2004/0173922 A1 | 9/2004 | Barnes et al. |
| 2005/0115721 A1 * | 6/2005 | Blau et al. ...................... 169/5 |
| 2005/0139365 A1 | 6/2005 | Richardson et al. |
| 2005/0189123 A1 | 9/2005 | Richardson et al. |
| 2005/0257866 A1 | 11/2005 | Williams et al. |
| 2006/0278409 A1 | 12/2006 | Blau et al. |
| 2008/0128145 A1 | 6/2008 | Butz et al. |
| 2010/0170684 A1 * | 7/2010 | Richardson et al. ............ 169/46 |
| 2010/0307775 A1 | 12/2010 | Robbins et al. |
| 2011/0226493 A1 | 9/2011 | Blau et al. |
| 2012/0085556 A1 | 4/2012 | Cox et al. |

FOREIGN PATENT DOCUMENTS

| | | | |
|---|---|---|---|
| EP | 0 784 998 A2 | | 7/1997 |
| EP | 0956883 A1 | | 11/1999 |
| EP | 1767248 A1 * | | 3/2007 |
| GB | 1 219 363 A | | 1/1971 |
| JP | 5248640 | | 11/1977 |
| JP | 2001346898 | | 12/2001 |
| JP | 20021650992 | | 6/2002 |
| WO | 93/15793 | | 8/1993 |
| WO | 9500205 A1 | | 1/1995 |
| WO | 9846529 A1 | | 10/1998 |
| WO | 99/01180 A2 | | 1/1999 |
| WO | 0006424 A1 | | 2/2000 |
| WO | 00/15305 A1 | | 3/2000 |
| WO | 03/024534 A1 | | 3/2003 |
| WO | 2004/028642 A1 | | 4/2004 |
| WO | 2004091729 A1 | | 10/2004 |

OTHER PUBLICATIONS

Written Opinion from the ISA/EP, International Application No. PCT/US2011/055081, mailed Aug. 22, 2012, six (6) pages.

Annex to Form PCT/ISA/206, Communication Relating to the Results of the Partial International Search, mailed Jun. 24, 2005.

Berezovsky, "Pyrogen, A Revolution in Fire Suppression Technology?", Fire Safety Engineering, vol. 5, No. 5, Oct. 1998, pp. 30-32.

Ebeling, Hans, et al., "Development of Gas Generators for Fire Extinguishing," Propellants, Explosives, Pyrotechnics, vol. 22, pp. 170-175, 1997.

Engelen, K., et al., "Pyrotechnic Propellant for Nitrogen Gas Generator," Bull. Soc. Chim Belg., vol. 106, No. 6, pp. 349-354, 1997.

Fallis, Stephen, et al., "Advanced Propellant/Additive Development for Fire Suppressing Gas Generators: Development + Test," Proceed- (56) References Cited

OTHER PUBLICATIONS ings of HOTWC-2002 12th Halon Options Technical Working Conference, Albuquerque, NM, Apr. 20-May 2, 2002, National Institute of Standards and Technology Special Publication 984.
Fletcher M., "Fighting Fire with Fir," Eureka (Inc. Engineering Materials and Design), Findlay Publications, Horton Kirby, Kent, GB, vol. 20, No. 1, Jan. 2000, p. 17, XP000877927, ISSN: 0261-2907 (Downloaded online version).
Mitchell, Robert M., Olin Aerospace Company, Report on Advanced Fire Suppression Technology (AFST) Research and Development Program, 52 pages, Report Date Sep. 1994.
Palaszewski, Bryan A., NASA Glenn Research Center, Safer Aircraft Possible with Nitrogen Generation, 2 pages, Mar. 2001.
PCT International Preliminary Examination Report, dated Jan. 17, 2005.
PCT International Search Report dated Mar. 17, 2005.
"Pyrogen: The New Revolution in Fire Suppression Technology," International Aircraft Systems, Fire Protection Working Group, Atlantic City, NJ. Aug. 29, 2000, 43 pages.
Saito, Naoshi, et al., "Flame-extinguishing Concentrations and Peak Concentrations of N2, Ar, Co2 and their Mixtures for Hydrocarbon Fuels," Fire Safety Journal, vol. 27, pp. 185-200, 1996.
Schmid, Helmut, et al., "Gas Generator Development for Fire Protection Purpose," Propellants, Explosives, Pyrotechnics, vol. 24, pp. 144-148, 1999.
TNO Defence, Security and Safety, "Solid Propellant Cool Gas Generators," 2 pages, unknown publication date.
U.S. Appl. No. 60/414,157, filed Sep. 28, 2002, to Joseph Michael Bennett, entitled, "In-Room Gas Generator Fire Protection System."
"Water Mist-Fire-Suppression Experiment," NASA Glenn Research Center, Dec. 2001, 3 pages.
Yang, Jiann C., et al., "Solid Propellant Gas Generators: An Overview and Their Application to Fire Suppression," International Conference on Fire Research and Engineering, Sep. 10-15, 1995, Orlando, FL, 3 pages.
PCT International Search Report mailed Nov. 23, 2006.
U.S. Appl. No. 60/955,559, filed Aug. 1, 2000, Smith et al.

* cited by examiner

GAS GENERATOR

FIELD

The disclosure, in various embodiments, relates generally to a gas generator assembly comprising multiple stacks of gas generant wafers within a common housing, and to a method of operation of the gas generator assembly. The generator and method may have specific applicability for use in fire suppression applications.

BACKGROUND

In the past, Halon halocarbons have found extensive application in connection with fire suppression. The term "Halon halocarbons" generally refers to haloalkanes, or halogenoalkanes, a group of chemical compounds consisting of alkanes with linked halogens and, in particular, to bromine-containing haloalkanes. Halon halocarbons are generally efficient in extinguishing most types of fires, are electrically non-conductive, tend to dissipate rapidly without residue formation and to be relatively safe for limited human exposure. In the past, Halon halocarbons, such as the halocarbon Halon 1301 (bromotrifluoromethane, $CBrF_3$), have found utility as fire suppressants in or for areas or buildings typically not well suited for application of water sprinkler systems, areas such as data and computer centers, museums, libraries, surgical suites and other locations where application of water-based suppressants can result in irreparable damage to electronics, vital archival collections or the like.

Halon halocarbons, however, have been found to have a detrimental impact on the environment due to their ozone-depleting effect on the earth's atmosphere.

BRIEF SUMMARY

Embodiments of the disclosure comprise a gas generator assembly and a method of operation.

In one embodiment, a gas generator assembly comprises a gas generator including a housing containing a plurality of laterally adjacent and laterally and axially supported stacks of gas generant wafers, and an ignition material adjacent one end of the laterally adjacent stacks. An initiator operably associated with the igniter material is communicable with an exterior of the housing. The housing comprises at least one closed port adjacent an opposing end of the laterally adjacent stacks, the at least one closed port having a closure configured to open in response to a pressure within the housing above ambient pressure.

In another embodiment, a method of generating a gas comprises substantially simultaneously igniting a plurality of laterally adjacent stacks of laterally and axially supported gas generant wafers within a common housing with an ignition material, increasing pressure within the housing responsive to generation of gas by combustion of the gas generant wafers, causing a closure of at least one port in the housing to open in response to the increased pressure and release pressurized gas from within the housing.

DETAILED DESCRIPTION

A gas generator, components thereof and a method of operation are described. While certain aspects of the disclosure make specific reference to gas generators particularly suited for use in fire suppression applications, the disclosure is not limited to fire suppression applications.

As described in greater detail below, a gas generator in accordance with embodiments of the disclosure includes structure to laterally and axially support gas generant material employed within the gas generator from adverse effects of vibration and other forces that may otherwise cause movement and deterioration of the gas generant material prior to use, and which enhance the reliability and provide a more constant and repeatable burn rate of the gas generant material upon ignition.

Figure 1:
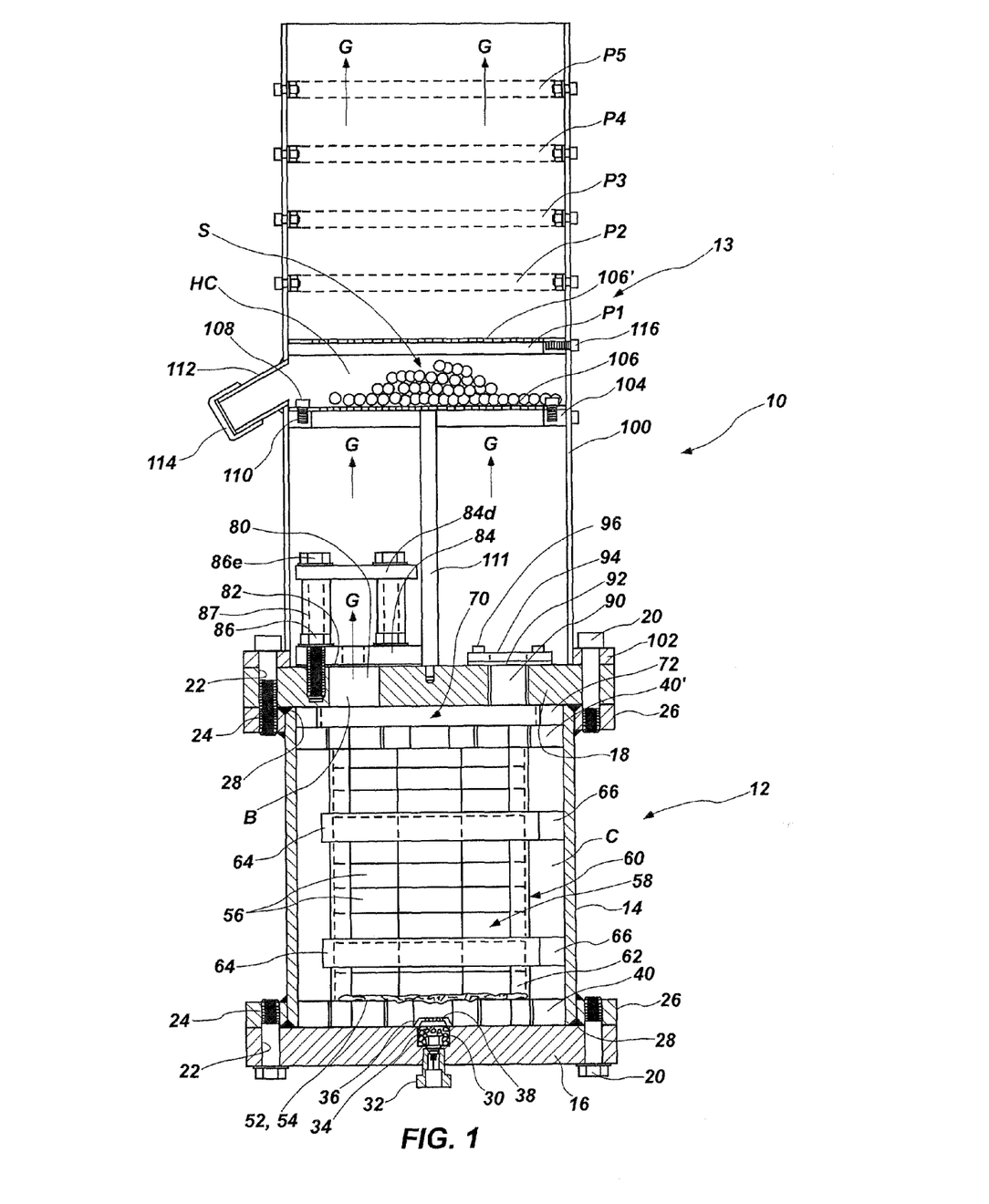
FIG. 1 is a side sectional view of a gas generator assembly including a gas generator and a gas discharge structure in accordance with an embodiment.

FIG. 1 depicts a gas generator assembly 10 according to an embodiment of the disclosure. Gas generator assembly 10 comprises a gas generator 12 and an associated gas discharge structure 13.

Gas generator 12 comprises a substantially cylindrical housing 14 having closed ends, one end comprising a base plate 16 and an opposing end comprising a cover plate 18 respectively secured thereto by a plurality of circumferentially spaced bolts 20 extending through holes 22 and into threaded apertures 24 in flanges 26 secured, as by welds, to housing 14. Gas-tight seals may be effected between each of base plate 16 and cover plate 18 using O-rings 28 disposed in annular grooves in surfaces of base plate 16 and cover plate 18 facing housing 14. Housing 14, base plate 16 and cover plate 18 may each comprise, for example, a metal material such as a steel material. Other materials, such as fiber-reinforced composites and reinforced ceramic materials, may also be suitable for particular applications. When assembled, such components enclose a chamber C and withstand elevated temperatures and pressures associated with operation of gas generator 12. It is contemplated that one end of the housing 14 may be formed integrally with the substantially cylindrical portion of the housing 14. For commercial applications, it is contemplated that housing 14 may be permanently sealed, as by welding, crimping, use of an adhesive, etc.

Base plate 16 includes an aperture 30, which may be centrally located and into which protrudes a distal end of initiator 32, which may be of conventional design and which, as known in the art, may be electrically initiated. An outer portion of aperture 30 may be configured, for example, with threads for use in securing initiator 32, while an inner portion of aperture 30 may be of an enlarged diameter and hold granules, tablets or other particles of an igniter material 34. A mouth of aperture 30 may be covered with a cover 36 secured thereover and having a plurality of holes 38 therethrough.

Figure 3A:
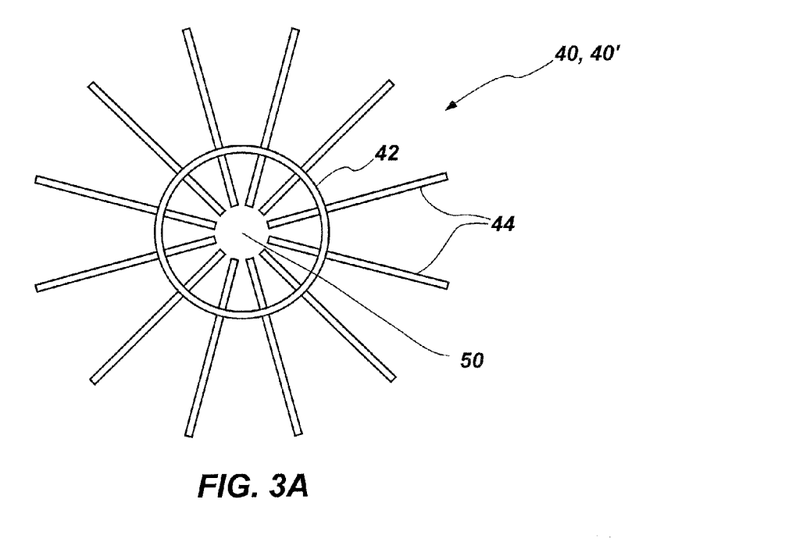
FIGS. 3A, 3B and 3C are, respectively, a spider for disposition within opposing ends of the housing of the gas generator for axially supporting the stacks of gas generant wafers, a ring of the spider and legs of the spider.
Figure 3B:
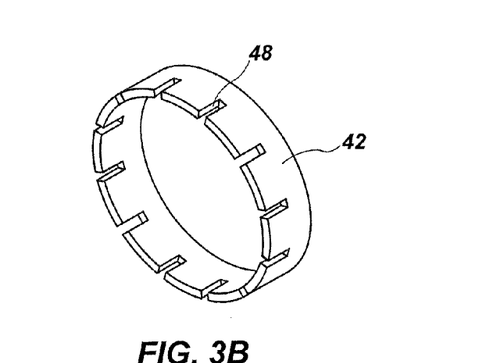
Figure 3C:
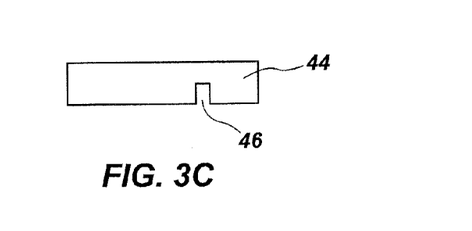

Axial support structure may be in the form of spider 40 (see FIGS. 3A through 3C), which is disposed adjacent base plate 16 within housing 14. The ring 42 of the spider 40 encircles the cover 36 and provides clearance above the cover 36. The legs 44 of the spider 40 comprise slots 46 which engage with slots 48 of ring 42 and are of a length to extend radially outward to a diameter slightly smaller than an inner diameter of housing 14 so as to centralize spider 40 within chamber C. The portions of legs 44 extending within ring 42 surround a central opening 50 into which cover 36 may protrude. The legs 44 and ring 42 may be secured together, for example, by welding.

A containment structure, for example, a foil pouch 52, such as of an aluminum material, containing granules, tablets or other particles of igniter material 54 and of a lateral extent greater than the diameter of cover 36, is adjacent spider 40 and extends under lowermost gas generant wafers 56 of a plurality (in this embodiment, seven) stacks 58 of gas generant wafers 56. Central opening 50 enables energy from combustion of igniter material 34 to reach and penetrate foil pouch 52 and ignite igniter material 54. However, it is contemplated that fewer or more than seven stacks 58 of gas generant wafers 56 may be employed, in consideration of the volume of gas to be generated and available space for installation of the gas generator assembly 10. For example, a smaller number of gas generant wafer stacks 58, such as four stacks, may be employed and a central gas generant wafer stack 58 eliminated. Igniter material 34 may be the same as igniter material 54 and each may comprise, for example, B/KNO$_3$. Furthermore, igniter material 34 and igniter material 54 may be combined in a common containment structure configured to provide proximity of a portion thereof immediately adjacent initiator 32. For example, a portion of the containment structure may protrude through central opening 50 toward, and in immediate proximity to, initiator 32.

Figure 2A:
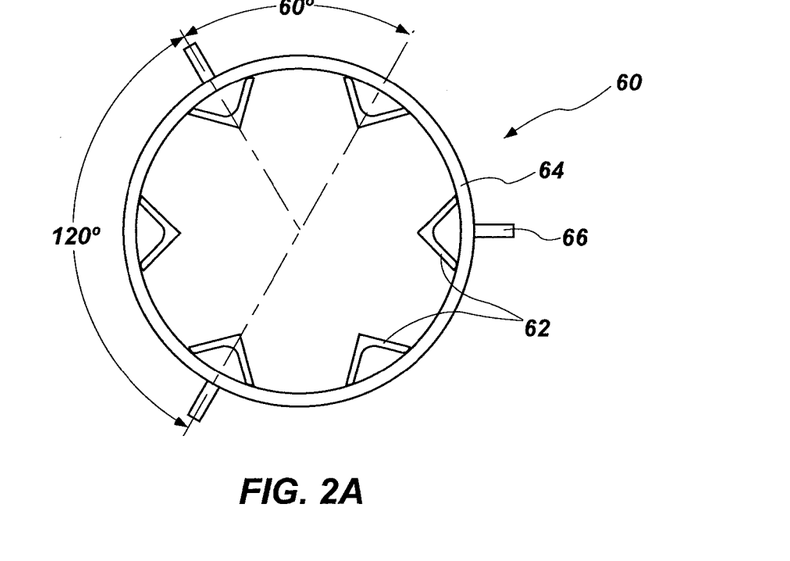
FIGS. 2A and 2B are, respectively, a top elevation and a side elevation of a cage for laterally supporting stacks of gas generant wafers within a housing of the gas generator.
Figure 2B:
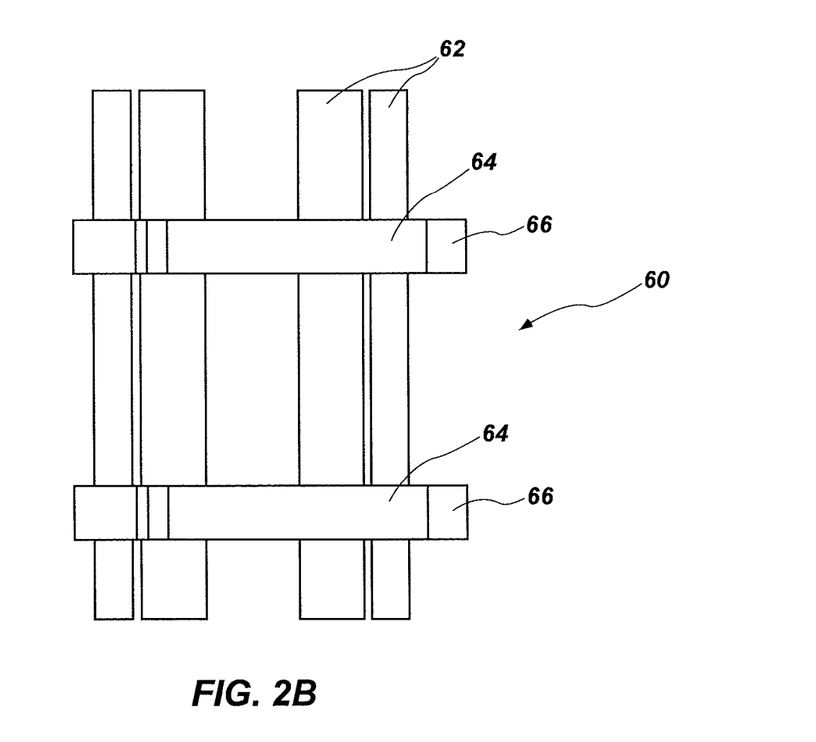
Figure 5:
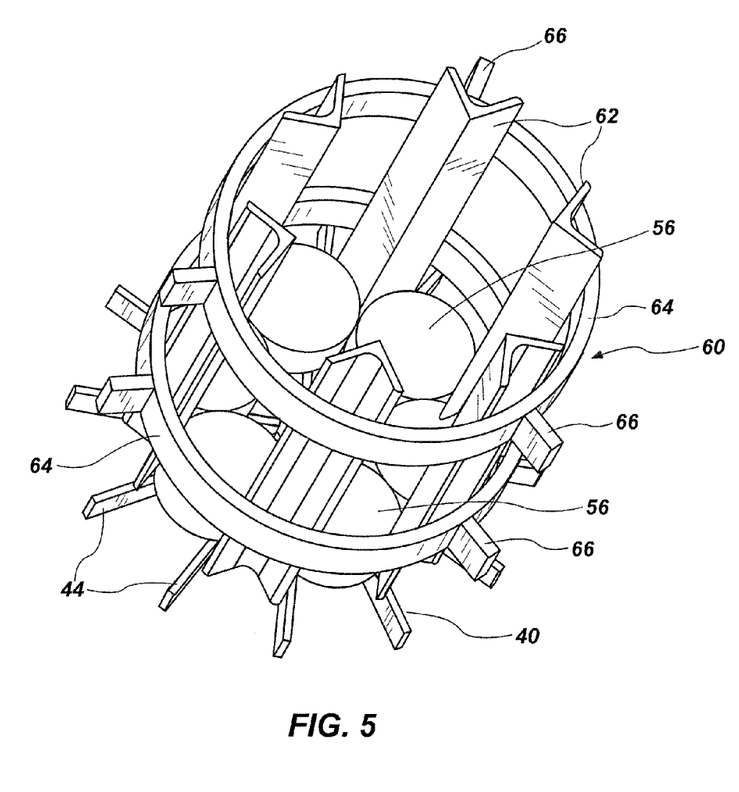
FIG. 5 is a perspective view of the cage of FIGS. 2A and 2B having lowermost gas generant wafers of stacks of gas generant wafers disposed therein and resting upon a spider of FIG. 3A.

One end of each of the gas generant wafer stacks 58 is adjacent foil pouch 52, and the gas generant wafer stacks 58 are laterally supported by lateral support structure, which may be in the form of cage 60 (see also FIGS. 2A and 2B), which comprises axially oriented, circumferentially spaced support segments 62 of "V" cross-section. Support segments 62 may comprise angle iron segments facing outwardly and secured, as by welding, to inner surfaces of axially spaced upper and lower support rings 64. Upper and lower support rings 64 are spaced from the ends of support segments 62, the lower ends of which support segments 62 extend (FIG. 5) between legs 44 of spider 40. While support segments 62 are shown disposed at 60° intervals associated with the use of six adjacent, circumferentially arranged gas generant wafer stacks 58, those of ordinary skill in the art will understand and appreciate that the number and spacing of such support segments 62 may be varied if more or fewer than six circumferentially spaced gas generant wafer stacks 58 are employed. Circumferentially spaced alignment tabs 66 protrude radially from the exterior surfaces of support rings 64 to a diameter slightly smaller than an inner diameter of substantially cylindrical housing 14 to centralize cage 60 within chamber C of housing 14. Cage 60, as shown in FIG. 1, has several support segments 62 omitted for clarity of viewing gas generant wafer stacks 58, with a central stack 58 being shown between two outer stacks 58.

Figure 8:
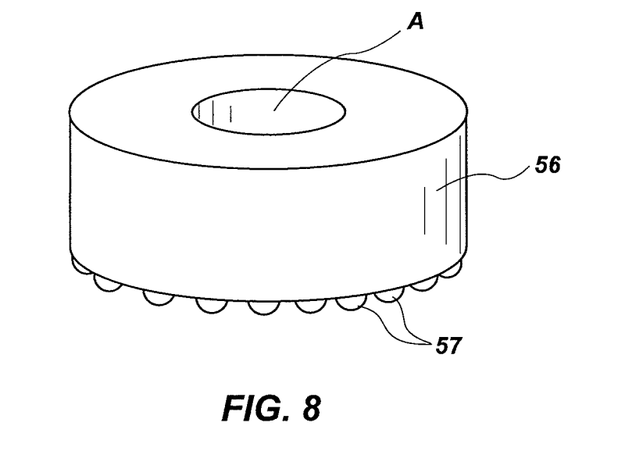
FIG. 8 is a perspective view of a gas generant wafer according to an embodiment of the disclosure.

Gas generant wafer stacks 58 comprise a plurality of gas generant wafers 56, which may be of substantially cylindrical configuration and comprise a central, axially extending aperture A (FIG. 8). Gas generant wafers 56 may also include a plurality of protrusions 57 from one major surface thereof, so as to provide a standoff between wafers assembled in a stack and facilitate combustion of all surfaces of each gas generant wafer 56.

At least some gas generant wafer stacks 58 are arranged circumferentially within cage 60 and the plurality of gas generant wafer stacks 58 may comprise a central wafer stack 58 surrounded by a plurality of for example, six circumferentially arranged outer wafer stacks 58. Each of the circumferentially arranged gas generant wafer stacks 58 is laterally supported along at least two points of an exterior of the stack (see FIG. 5) by the lateral support structure and, more specifically in the illustrated embodiment, edges of the angle irons. The central wafer stack 58 is laterally supported by contact with the surrounding circumferential wafer stacks 58.

Figure 4:
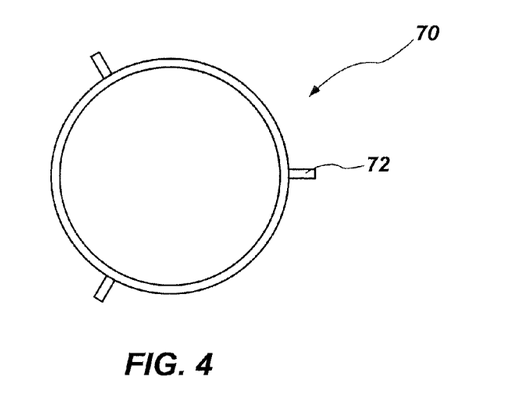
FIG. 4 is a top elevation of a retainer ring for disposition within the housing adjacent one end thereof for axially supporting the stacks of gas generant wafers.

Axial support structure in the form of another spider 40', which may be of the same size and construction as spider 40 adjacent base plate 16, is adjacent an opposing end of each of the wafer stacks 58 from spider 40, nesting with upper portions of support segments 62 in the manner described above with respect to spider 40. Additional axial support structure, for example, in the form of retainer ring 70 (FIG. 4) of smaller diameter than an inner diameter defined by segments 62 may be located adjacent spider 40' on a side thereof opposing wafer stacks 58. Retainer ring 70 may, optionally, comprise circumferentially spaced alignment tabs 72 protruding radially from an exterior surface of retainer ring 70 to centralize retainer ring 70 within chamber C, or may be centralized by use of a groove of like diameter in the interior surface of cover plate 18. Retainer rings 70 of various axial heights may be employed, the height depending upon the number of gas generant wafers 56 in wafer stacks 58 selected for a given application. However, the axial length of substantially cylindrical housing 14 may be selected based on a selected height of the wafer stacks 58 and other components having an axial height, to minimize free volume within chamber C and enhance the rate of pressure increase within chamber C upon ignition of gas generant wafers 56. In such a case, retainer ring 70 may be eliminated.

The components of spiders 40, 40', cage 60 and retainer ring 70 may be formed of a metal material, for example, a steel material.

The combined use of cage 60, spiders 40 and 40' and retainer ring 70, when cover plate 18 is secured to housing 14, laterally and axially supports gas generant wafer stacks 58 against vibration and other forces that may damage the wafer stacks 58 during handling and installation of gas generator 12, and supports gas generant wafer stacks 58 during ignition and while burning. The use of retainer rings 70 of different heights to bridge differing axial gaps between spider 40' and cover plate 18 resulting from the use of different numbers of gas generant wafers 56 employed in wafer stacks 58, may provide precise, reliable axial support regardless of stack height.

Cover plate 18 comprises at least one gas exhaust port 80 of bore diameter B therethrough, with which is associated a closure (see enlarged FIG. 6), which may take the form of a frangible barrier 82 configured as a burst disc. An orifice plate 84 having a lesser bore diameter than the diameter of bore B may, optionally located over gas exhaust port 80 and secured thereover to cover plate 18. Frangible barrier 82 and orifice plate 84, if used, may be secured to cover plate 18 with bolts 86. If no orifice plate is employed, an annular hold-down collar (not shown) having a bore diameter similar to that of the at least one gas exhaust port 80 may be employed to secure frangible barrier 82. The use of an orifice plate 84 enables adjustment of an effective size of the gas exhaust port 80 and, thus, the rate of gas expelled from chamber C to maintain an adequate pressure within the chamber C to ensure a self-sustaining burn rate of gas generant wafers 56 and regulate a gas exit rate from chamber C for the desired application of gas generator 12. Cover plate 18 may also, optionally carry a diffuser plate 84d mounted above orifice place 84 using, for example, elongated bolts 86e to secure both orifice plate 84 and diffuser plate 84d to cover plate 18 and sleeves 87, through which elongated bolts 86e extend, may be used to space diffuser plate 84d above orifice plate 84 (see enlarged FIG. 6). The use of diffuser plate 84d may effectively block a high-energy stream of pressurized gas G directed axially from gas exhaust port 80, in order to prevent damage to portions of gas discharge structure 13 above the gas exhaust port 80 from the gas stream and diffuse the gas stream for passage through a heat sink chamber as described below.

Figure 6:
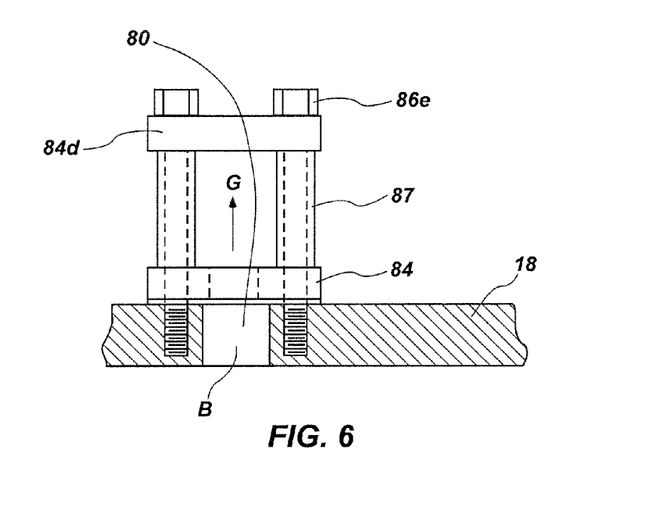
FIG. 6 is an enlarged, side sectional view of one end of a portion of the housing of the gas generator assembly of FIG. 1 showing an exhaust port having a frangible barrier, an orifice plate and a diffuser plate secured over the gas exhaust port.

An appropriately selected orifice size for the volume and burn rate of gas generant material within chamber C also minimizes the potential for rupture of housing 14 of gas generator 12 due to excessive internal pressure. However, one or more overpressure release ports 90 having burst discs or other frangible barriers 92 secured thereover as by a collar 94 and bolts 96 may be incorporated into cover plate 18, into housing 14 or into base plate 16, as desired. Of course, the burst pressure of frangible barriers 92 may be selected to be greater than a burst pressure of frangible barrier 82 to ensure that the latter fails first and that the gas generator 12 operates properly unless and until an undesirable overpressure condition occurs within chamber C. Of course, more than one gas exhaust port 80 may be employed, and only a single, or greater than two, overpressure release ports 90 may be employed.

Compositions for gas generant materials suitable for use in wafers 56 are known to those of ordinary skill in the art and may differ depending upon the intended application for the generated gas. For use in fire suppression, particularly for human-occupied areas, the gas generant material of gas generant wafers 56 may be a HACN composition, as disclosed in U.S. Pat. Nos. 5,439,537, 5,673,935, 5,725,699, and 6,039,820 to Hinshaw et al., the disclosure of each of which patents is incorporated by reference herein. The HACN used in the gas generant material may be recrystallized and include less than approximately 0.1% activated charcoal or carbon. By maintaining a low amount of carbon in the gas generant material, the amount of carbon-containing gases, such as CO, $CO_2$, or mixtures thereof, may be minimized upon combustion of the gas generant material. Alternatively, a technical grade HACN having up to approximately 1% activated charcoal or carbon may be used. It is also contemplated that conventional gas generant materials that produce gaseous combustion products that do not include carbon-containing gases or NO may also be used.

The HACN composition, or other gas generant material, may include additional ingredients, such as at least one of an oxidizing agent, ignition enhancer, ballistic modifier, slag-enhancing agent, cooling agent, a chemical fire suppressant, inorganic binder, or an organic binder. By way of example, the HACN composition may include at least one of cupric oxide, titanium dioxide, guanidine nitrate, strontium nitrate, and glass. Many additives used in the gas generant material may have multiple purposes. For sake of example only, an additive used as an oxidizer may provide cooling, ballistic modifying, or slag-enhancing properties to the gas generant material. The oxidizing agent may be used to promote oxidation of the activated charcoal present in the HACN or of the ammonia groups coordinated to the cobalt in the HACN. The oxidizing agent may be an ammonium nitrate, an alkali metal nitrate, an alkaline earth nitrate, an ammonium perchlorate, an alkali metal perchlorate, an alkaline earth perchlorate, an ammonium peroxide, an alkali metal peroxide, or an alkaline earth peroxide. The oxidizing agent may also be a transition metal-based oxidizer, such as a copper-based oxidizer, that includes, but is not limited to, basic copper nitrate ($[Cu_2(OH)_3NO_3]$) ("BCN"), $Cu_2O$, or $CuO$. In addition to being oxidizers, the copper-based oxidizer may act as a coolant, a ballistic modifier, or a slag-enhancing agent. Upon combustion of the gas generant wafers 56, the copper-based oxidizer may produce copper-containing combustion products, such as copper metal and cuprous oxide, which are miscible with cobalt combustion products, such as cobalt metal and cobaltous oxide. These combustion products produce a molten slag, which fuses at or near the burning surface of the gas generant wafers 56 and prevents particulates from being formed. The copper-based oxidizer may also lower the pressure exponent of the gas generant material, decreasing the pressure dependence of the burn rate. Typically, HACN-containing gas generants material that include copper-based oxidizers ignite more readily and burn more rapidly at or near atmospheric pressure. However, due to the lower pressure dependence, they burn less rapidly at extremely high pressures, such as those greater than approximately 3000 psi.

In the illustrated embodiment, gas discharge structure 13 extends axially from gas generator 12 and comprises a substantially cylindrical, tubular housing 100 having an annular flange 102 at an end thereof proximate gas generator 12 and secured thereto using bolts 20 extending through holes 22 in cover plate 18.

Figure 9:
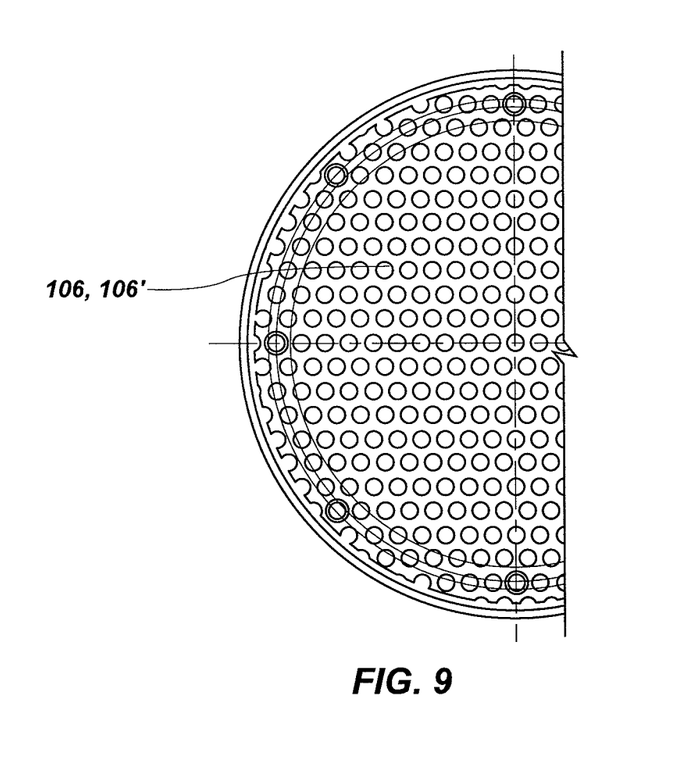
FIG. 9 is a top elevation of a portion of a circular, perforated support plate as employed in the gas discharge structure of the gas generator assembly of FIGS. 1 and 7.

An annular support 104 is secured within tubular housing 100 above cover plate 18 using, for example, welds or bolts. A perforated heat sink material support which may be in the form of perforated support plate 106 (see also FIG. 9) may be secured to support 104 using a plurality of circumferentially spaced bolts 108 which are threaded into axially extending holes 110 from the top of support 104. A support rod 111 may, optionally, be secured to cover plate 18 below perforated support plate 106 and extend to the center thereof to prevent bowing under the weight of a heat sink material above, as will be subsequently described.

Another perforated heat sink material support in the form of perforated support plate 106' (see also FIG. 9), which may be of the same material, size and have the same perforation size and pattern as those of perforated support plate 106, is disposed axially above support plate 106, the two perforated support plates 106, 106' and a segment of tubular housing 100 between these two components providing a heat sink chamber HC. Heat sink chamber HC contains a heat sink material of a material and in a form to absorb heat from gas G exiting from chamber C of gas generator 10 through the at least one gas exhaust port 80 and passing through gas discharge structure 13 and cool the gas G without creating an undesirably high back pressure below perforated support plate 106 as the gas passes through the heat sink material. One suitable heat sink material may be in the form of metal pellets or particles, such as, for example, steel shot S (only some shown for clarity in FIG. 1, although heat sink chamber HC is filled with steel shot S for operation) of a diameter larger than a diameter of the holes in perforated support plates 106 and 106', such an arrangement providing passages for gas between the steel shot S. Outlet tube 112 opening into heat sink chamber HC above perforated support plate 106 may, when cap 114 is removed, be used to remove the steel shot S or other heat sink material from heat sink chamber HC, if desired. The components of the gas discharge structure 13 may be fabricated from a metal material, for example, a steel material.

As shown in FIG. 1, perforated support plate 106' may be secured to tubular housing 100 by bolts 116 and may be axially adjustable in position within tubular housing 100 at a plurality of positions P1 through P5. Heat sink chamber HC and, thus the quantity of steel shot S, may be varied as desirable to effect sufficient heat reduction in the exhausting gas, and the selected quantity of steel shot may be snugly contained within heat sink chamber between perforated support plates 106 and 106'.

Figure 7:
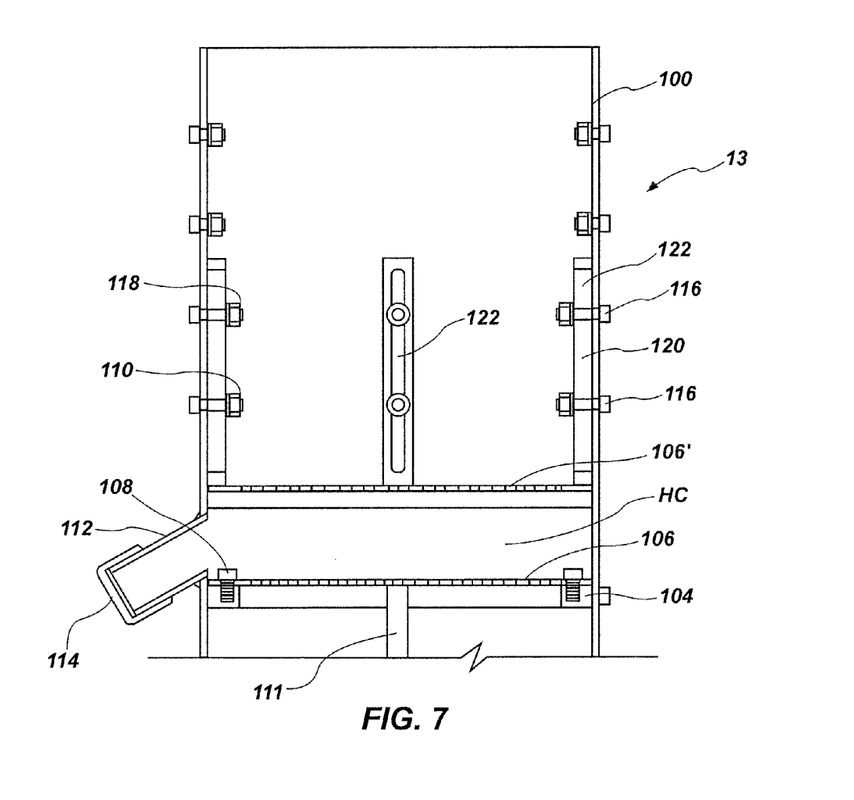
FIG. 7 is a side sectional view of another embodiment of a heat sink chamber portion of a gas discharge structure of the gas generator assembly of FIG. 1 employing an axially adjustable perforated plate to enable a volume of heat sink material disposed within a coolant chamber to be precisely varied and axially and laterally constrained.

FIG. 7 depicts another embodiment of a heat sink chamber portion of a gas discharge structure 13, wherein perforated support plate 106' is more finely axially adjustable within tubular housing 100. In the embodiment of FIG. 7, axially extending struts 120 having axial slots 122 therein are secured to perforated support plate 106' proximate its outer diameter, and bolts 116 extend through slots 122 to nuts 118, which may be tightened when perforated support plate 106' is axially adjusted to a desired position. For example, perforated support plate 106' may be adjusted to maintain a compact mass of steel shot S (see FIG. 1) within heat sink chamber HC after steel shot S has, optionally, been vibrated within tubular housing 100 to minimize free space between steel shot S.

In operation, the gas generator assembly of embodiments of the present disclosure is selectively actuated by operation of initiator 32, which may be effected in response to an undesired environmental condition sensed by a sensor, as is well known in the art, or manually by a human sensing such condition. For example, temperature and smoke sensors may be employed, as may be a manual switch. When initiator 32 is placed into operation, it ignites igniter material 34 and 54 via ignition of igniter material 34, which, in turn, substantially simultaneously ignites gas generant wafers 56 of wafer stacks 58. Pressure increases within gas generator 12 as the gas generant material combusts and generates gas, so that burning of gas generant wafers 56 becomes self-sustaining, and frangible barrier 82 fails at approximately a predetermined internal pressure of gas generator housing 14 greater than ambient pressure in the environment surrounding gas generator 12. Generated gas G from the combusting gas generant wafers 56 is released into gas discharge structure 13 through at least one gas exhaust port 80 and flows through heat sink material comprising steel shot S and, subsequently out of gas discharge structure 13 for its intended purpose.

While the disclosure has been described with references to certain illustrated embodiments, it is not so limited. Those of ordinary skill in the art will understand and appreciate that additions and modifications to, and deletions from, the illustrated embodiments may be made without departing from the scope of the invention, which is limited only by the claims which follow herein, and their legal equivalents.

What is claimed is:

1. A gas generator assembly, comprising:
   a gas generator including:
   a substantially cylindrical housing containing:
   a plurality of laterally adjacent and laterally and axially supported stacks of substantially cylindrical gas generant wafers located within a chamber within the housing in spaced relationship to and free from contact with structure of a side wall of the housing, at least some of the plurality of laterally adjacent gas generant wafer stacks being:
   laterally supported by lateral support structure extending axially along a length of a respective stack and located inwardly of the side wall of the housing, substantially contacting the respective stack on at least a part of a circumference thereof and supporting each stack against rotational movement within the housing; and
   axially supported at opposing ends by axial support structure contacting gas generant wafers of the respective stack;
   the gas generant wafers of the stacks formulated and of sufficient mass in combination to, upon ignition, generate a gas within the chamber of a pressure in excess of ambient; and
   igniter material adjacent each of the plurality of laterally adjacent stacks adjacent one end of the housing; and
   an initiator operably associated with the igniter material and communicable with an exterior of the housing;
   the substantially cylindrical housing comprising at least one closed gas exhaust port in communication with the chamber adjacent an opposing end of the plurality of laterally adjacent stacks, the at least one closed gas exhaust port configured to open to release the gas to an exterior of the substantially cylindrical housing in response to substantially a predetermined pressure within the chamber above ambient pressure.

2. The gas generator assembly of claim 1, further comprising a gas discharge structure into which the at least one gas exhaust port communicates when open.

3. The gas generator assembly of claim 2, wherein the gas discharge structure further comprises a substantially tubular housing including a heat sink chamber containing a heat sink material providing passages for gas from the at least one gas exhaust port therethrough.

4. The gas generator assembly of claim 3, wherein the heat sink material comprises steel shot.

5. The gas generator assembly of claim 4, wherein the steel shot is contained between two axially separated perforated supports within the substantially tubular housing.

6. The gas generator assembly of claim 5, wherein a position of at least one of the perforated supports is axially adjustable within the tubular housing.

7. The gas generator assembly of claim 1, wherein the axial support structure comprises spiders disposed adjacent opposing ends of the plurality of laterally adjacent stacks, the lateral support structure comprises a cage laterally surrounding the plurality of laterally adjacent stacks, and a retainer ring adjacent one of the spiders on a side thereof opposing the plurality of laterally adjacent stacks.

8. The gas generator assembly of claim 7, wherein
   each spider comprises a plurality of radially extending legs secured to a ring intermediate ends of the legs, inner ends of the legs surrounding a central opening and outer ends of the legs defining a diameter slightly smaller than an inner diameter of the housing, one spider adjacent one end of the housing;
   the cage comprising a plurality of axially spaced support rings having a plurality of axially oriented, circumferentially spaced support segments secured thereto, the support rings being axially spaced from ends of the support segments; and
   the retainer ring disposed between the one of the spiders and adjacent an opposing end of the housing.

9. The gas generator assembly of claim 1, wherein the gas generant wafers are of cylindrical shape.

10. The gas generator assembly of claim 9, wherein the gas generant wafers further comprise an axial, central aperture.

11. The gas generator assembly of claim 1, wherein the gas generant wafers comprise an HACN composition.

12. The gas generator assembly of claim 1, wherein the plurality of laterally adjacent gas generant wafer stacks comprises seven gas generant wafer stacks.

13. The gas generator assembly of claim 1, wherein at least some of the plurality of laterally adjacent gas generant wafer stacks are arranged circumferentially within the chamber.

14. The gas generator assembly of claim 1, further comprising a frangible barrier closing the at least one closed gas exhaust port, the frangible barrier structured to fail and open the at least one closed gas exhaust port in response to substantially the predetermined pressure within the chamber above ambient pressure.

15. The gas generator of claim 1, further comprising a changeable orifice plate having a bore diameter less than a bore diameter of the at least one gas exhaust port secured in alignment with the at least one gas exhaust port.

\* \* \* \* \*